(12) United States Patent
Brown et al.

(10) Patent No.: US 7,103,420 B2
(45) Date of Patent: Sep. 5, 2006

(54) METHOD FOR IMPLEMENTING DEVICE OPERATIONS BASED ON DEVICE STATUS INFORMATION STORED IN A CENTRAL LOCATION

(75) Inventors: William A. Brown, Raleigh, NC (US); Richard William Muirhead, Tyler, TX (US); Francis Xavier Reddington, Sarasota, FL (US)

(73) Assignee: International Business Machines Corporation, Armonk, NY (US)

( * ) Notice: Subject to any disclaimer, the term of this patent is extended or adjusted under 35 U.S.C. 154(b) by 382 days.

(21) Appl. No.: 10/199,246

(22) Filed: Jul. 18, 2002

(65) Prior Publication Data
US 2004/0015241 A1 Jan. 22, 2004

(51) Int. Cl.
*G05B 19/04* (2006.01)

(52) U.S. Cl. .............................. 700/19; 700/12; 700/23; 709/223; 709/224; 725/79; 340/3.1; 340/825.52

(58) Field of Classification Search .................... 700/9, 700/11, 12, 14, 16, 19, 284, 276, 277, 23; 340/825.52, 825.69, 825.72, 3.1; 709/203, 709/208, 223, 224; 725/79
See application file for complete search history.

(56) References Cited

U.S. PATENT DOCUMENTS 6,112,127 A * 8/2000 Bennett ........................ 700/86
6,192,282 B1 * 2/2001 Smith et al. .................. 700/19
6,385,495 B1 * 5/2002 Bennett ........................ 700/86

\* cited by examiner

*Primary Examiner*—Anthony Knight
*Assistant Examiner*—Michael B. Holmes
(74) *Attorney, Agent, or Firm*—David A. Mims, Jr.; Darcell Walker (57) ABSTRACT

The present invention provides a method and system to monitor the statuses of devices that can operate and transmit current device status information to a storage location. In this system, there is a can be a central storage location of the status of all designated device attributes of a device including the past state history of the device. The storage location can also be distributed and in one or more remote locations. Each device on the system will transmit a state change notification to the central location each time the status of the device changes. This status change will be recorded in the location storage. The present invention provides for the creation of sets of instructions to enable the initiation of operations by devices in response to a set of current statuses of one or more devices. Each workflow routine will be based on a set device statuses. This set of device statuses can be referred as a device scenario. When a status of a device changes, there will be check of the statuses of the devices in the scenario to determine if the scenario conditions for the workflow have been met. When the conditions have been met, the workflow routine will be initiated and perform a set of instructions which could lead to the initiating of some activity by one or more devices in the network.

12 Claims, 8 Drawing Sheets

| 1 | On | 4:22pm | 75°F |
|---|---|---|---|
| 2 | Off | 3:58pm | 72°F |
| 3 | Off | 3:38pm | 77°F |
| 4 | On | 3:25pm | 77°F |
| 5 | On | 3:18pm | 78°F |
| 6 | Off | 2:30pm | 73°F |
| 7 | On | 2:17pm | 77°F |
| 8 | Off | 1:30pm | 72°F |
| 9 | On | 1:10pm | 76°F |
| 10 | Off | 12:30pm | 73°F |

METHOD FOR IMPLEMENTING DEVICE OPERATIONS BASED ON DEVICE STATUS INFORMATION STORED IN A CENTRAL LOCATION

FIELD OF THE INVENTION

This invention relates to a method for automatically operating devices connected to a network and in particular to a method for capturing the operating status history of the devices and using the operating status data of one or more devices to automatically implement operating instructions for control one or more devices connected in that existing network environment.

BACKGROUND OF THE INVENTION

Automation systems are used to control the behavior of an environment such as an industrial plant, an office building or a residential dwelling. Currently there is an increasing trend to automate various activities and task in our society. Industries such as the banking industry, the automotive industry, the oil and refining industry and transportation industry use computers and automation to control machines and other various devices during the performance of many tasks and processes. The application of automation control systems has expanded from large industries to small businesses and residential homes.

Home automation systems, or home management systems as they are sometimes called, commonly provide for control of lighting, heating and air conditioning, window shades or curtains, pool heaters and filtration systems, lawn sprinklers, ornamental fountains, audio/visual equipment, and other appliances. Home automation systems are frequently integrated with a home security system so that when a fire alarm is raised, for example, internal and external lights will be turned on. Security systems frequently include lighting control and other types of home automation as an option. Many larger homes incorporate a home theater that requires a certain amount of automation for convenient operation and this automation is often extended to other parts of the dwelling. In farms, the automation system will also control outbuilding heating and lighting and warn of abnormal conditions in automated feeding machinery and other equipment.

One form of automation system includes a central control unit that monitors environmental sensors and inputs from user controls and maintains a schedule of preprogrammed time-of-day and day-of-the week events. Inputs to the central control are provided by dedicated low-voltage wiring, for example, from door and window sensors, signals carried on power lines, RF signals, signals on existing telephone wiring and, occasionally, optical signals. The central control unit is controlled by a program that is either specifically built for the particular installation or a general-purpose program with a user interface that allows the owner or a technician employed by the owner to make certain types of modifications. The interfaces to these programs can be anything from strings of digits entered on standard touch-tone keypads, for example, Home Automation Inc.'s Omni Automation and Security System, to graphical user interfaces, for example, the Molex "Choices" software.

The communication between the central control unit and various devices can be through a variety of protocols. The Echelon Corporation has built home automation and industrial control apparatus based on a signaling protocol they refer to as LonWorks that uses a network of nodes each of which has one or more microprocessors. The system is designed to operate in a "cooperative computing" environment in which the individual nodes maintain their own programs. Programming of the individual nodes can be done by downloading new software from a temporarily attached lap top computer or by downloading software over the LonWorks network. A similar approach has been taken by CEBus and has been used in many custom installations for larger homes and office buildings. While such systems eliminate the central control unit, modifying the software still requires the use of a PC-based system and usually requires the user to acquire relatively expensive hardware and software and become proficient in the use of PC-based software.

The latest internationally accepted standard for residential communication is the Consumer Electronics Bus (CEBus). The Media used in a CEBus Network topology can vary between power-line wiring (PL), telephone wiring (TP twisted-pair), coaxial cable (CX), RF (radio frequency) and the like. It provides the standard for creating products and devices to communicate with each other, and should build intelligence into homes or any physical or virtual facility with smart products (aggregation of smart devices) in anticipating tomorrow's consumer needs. Though the intent of the original specification was directed at the residential market, the inventions disclosed here by its three inventors have envisioned a much more extensive application uses. The consumer can be any person, a firm, government agency, whatever or whomever has a need to communicate to smart devices.

The official name for CEBus standard is ANSI/EIA 600. At the core of the standard are the CAL (Common Application Language) and the Application Layer. It provides the basis of the interoperability between CEBus compliant devices and a transport independent version (Generic CAL) (Generic CAL) ANSI/739 that an integral part of the Home PnP (Plug and Play) ANSI/721 specification (which defines how networked products of various manufactures achieve interoperability regardless of the communication protocol used (CEBus, X-10, RS-232, IEEE-1934, TCP/IP etc.)

The devices that utilize these standards contain context data structures. Each CAL Context is a predefined data structure built from reusable objects, and represents a common consumer product function such as a tuner, time or temperature sensor. These context data structures are defined in a set of subsystems definitions that represent industry standard guidelines that define the behavior of the device, which is necessary to enable products to correctly use the subsystem models.

In a home, there are many appliances/devices that are powered by electricity, either AC or DC. At the present time, these devices do not have the ability to communicate with each other. In addition, there is no standard method to keep track of the current state of each device. The state attributes could be for example 'on', 'off', 'channel', 'temperature' etc. Currently some devices have a means to report information back to the manufacturer of the device activities of the device through proprietary channels, however there is no way currently for the various devices to communicate with each and no way for the homeowner to receive this type of status information. In addition, a homeowner or facility owner does not have a way to control these devices or who has access to these devices.

Electronic devices traditionally have two states either on or off. Today, with the use of Context data structures embedded within a device, non-persistent property characteristics are stored within the device. This property data is overwritten as changes to the device occur. Storage of this information outside this limited capacity of the device is necessary for any applied application. It is desirable to provide an automation system that has a central control unit that can enable various devices on the same system to communicate with each other. In addition it is desirable to have a standard method to keep track of the current and past states of each device on the system. It is another desire to have a system when the homeowner or facility owner can have access to and control these devices. In addition to these desires, it is also desirable to provide an automation system that is inexpensive, easily installed, easily programmable and reprogrammable. It is also desirable to provide an automation system that allows the incorporation of new and different, appliances and controllers without the system becoming obsolete. Lastly, it is desirable to provide a method that can implement instructions to automatically operate one or more devices on the network based on a set of operating statuses of devices on that network.

SUMMARY OF THE INVENTION

It is an objective of the present invention to provide a method and system monitor the status of devices that operate in an environment such as a physical facility.

It is a second objective of the present invention to provide a central location that will store the status each device.

It is a third objective of the present invention to create and maintain a history of the activity of a device through the recording of the status history of the device.

It is a fourth objective of the present invention to provide a method by which each device would transmit to the storage location a new status whenever there was a change in status of the device.

It is a fifth objective of the present invention to provide a set of instructions to enable one or more devices on the network that performs operations in accordance with the set of instructions.

It is a sixth objective of the present invention to provide a set of instructions to enable one or more devices on the network that performs operations based on the current status of one or more devices.

It is a seventh objective of the present invention to determine a set of conditions under which the set of instructions will be initiated to enable one or more devices on the network to perform operations based on the current status of one or more devices.

In this invention, each device in the network is in communication with a state manager device. Within this state manager can be a storage location that will store the identity of each device and the current and past statuses of the device. The storage location can also be a remote location. The status is any current state of a device can have one general attribute or multiple attributes. An example of a device is a videocassette recorder. The status could be one attribute such as "off" and "on" or multiple attributes such as off, on, start, stop, rewind, record, pause, program or channel. For a multiple attribute device, a change in any attribute would constitute a change in the device status. When this change occurred, the device would transmit the change to the state manager. This change in status would be stored as the current status of the device. For each device, the storage location would contain a current status and a set of past statuses such the owner of the facility or any authorized user could view the activity history of a device.

The present invention provides for the creation of sets of instructions to enable the initiation of operations by devices in response to a set of current statuses of one or more devices. Each workflow routine will be based on a set device statuses. This set of device statuses can be referred as a device scenario. When a status of a device changes, there will be check of the statuses of the devices in the scenario to determine if the scenario conditions for the workflow have been met. When the conditions have been met, the workflow routine will be initiated and perform a set of instructions which could lead to the initiating of some activity by one or more devices in the network.

BRIEF DESCRIPTION OF THE DRAWINGS

FIG. 9a is a flow diagram of the workflow for an electrical outlet when a device connected to the outlet begins operations.

FIG. 9b is a flow diagram of the workflow for an electrical outlet when a device connected to the outlet ceases operations.

DETAILED DESCRIPTION OF THE INVENTION

The present invention provides a method to collect a unique set of data containing the operations of a device over a period of time. In order to clearly illustrate the techniques in this invention, the description of this invention will be in the context of an application in a physical facility. However, the application of this invention encompasses applications in addition to the physical facility environment described herein. In this example, the present invention provides a method and system to monitor and manage the statuses of devices that operate in a physical facility from a central location. The physical facility can vary and can be for example a business, a factory, a computing center, a distributed network of devices, or satellites orbiting in space. The implementation of the present invention does not need to be configured as a centralized control contained within a building structure. For example, the facility can be a home is using the latest internationally accepted standard for residential communication (which in this example is the Consumer Electronics Bus (CEBus)), In this home the State Management repository will hold persistent all state information of all compliant devices. For example, for a radio device, the repository will capture data that comprise the present and past state of the radio, how long it has been on, its tuned broadcasting frequency, its volume level, the time it was tuned to that particular station, the station it was tuned to previously, and the time it was tuned to that previous station. For a different device, the system will also capture the status of the smoke detectors in the house, whether they are operable, if they need maintenance, when each detector was last activated, and the amount of time they were active. The State Management repository of the present invention can also capture anyone or any device trying to gain electronic access to devices in this facility, the time of the attempted access, the purpose of this access, and the origin of this access attempt This data can remain in the persistent store for the life of the device, the life of the home, or a predetermined time period established by the owner.

The communication with all compliant devices in this CEBus Network topology can use any or all of the following mediums; power-line wiring (PL), telephone wiring (TP twisted-pair), coaxial cable (CX), RF (radio frequency) and other similar transmission mediums. The present invention provides the standard for creating products and devices to communicate with each other, and build intelligence into homes or any physical or virtual facility with smart products (aggregation of smart devices) in anticipating the needs of tomorrow's consumer. The present invention has applications in various segments of society, which include individual consumers, a business, a firm, or governmental agency.

Figure 1:
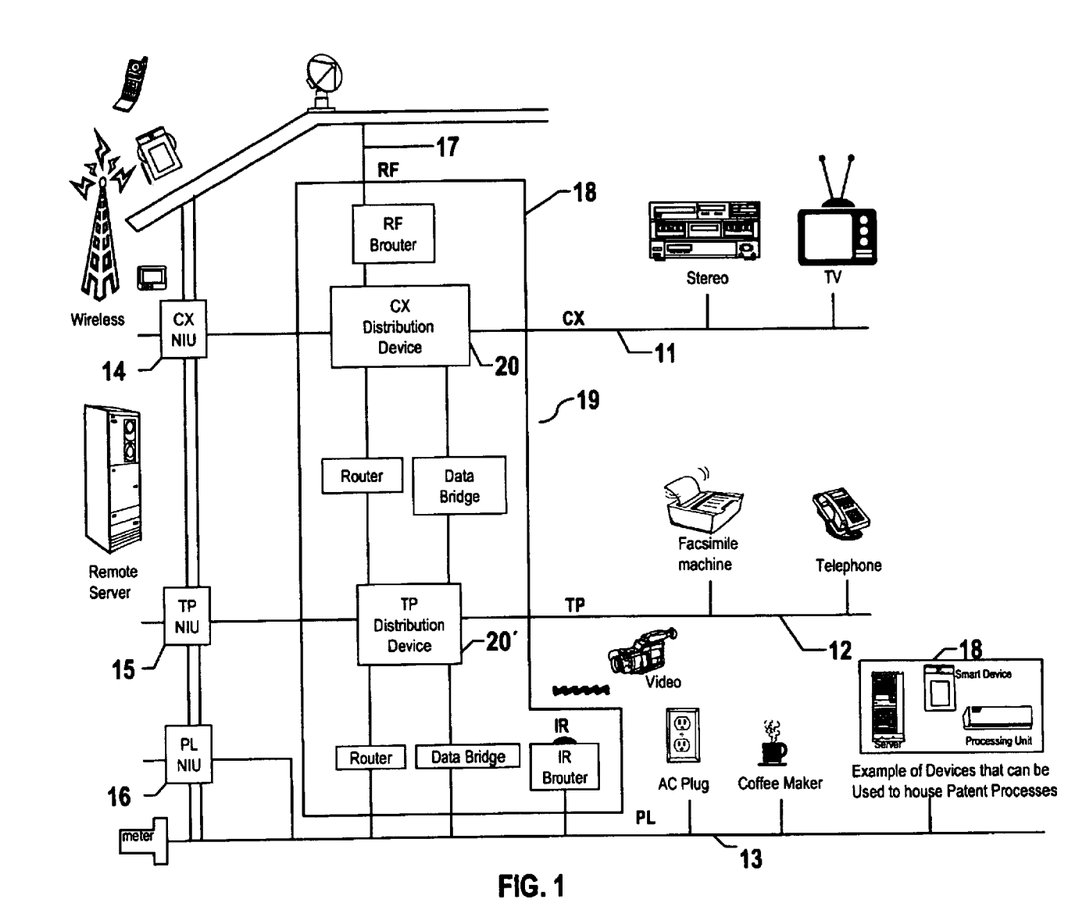
FIG. 1 is an illustration of a configuration of components in a physical facility that implements the method and system of the present invention.

FIG. 1 is a configuration of components in the system of the present invention. In this configuration lines 11, 12 and 13 are various ways that information and energy can enter a facility to enable operations of the devices in the facility. Line 11 represents communications over a coaxial cable through a device such as a television set. Line 12 represents communications over twisted pair cables through a device such as a telephone. Line 13 represents the supply of energy through a standard power line wired into the facility to operate devices and appliances in the facility such as a coffee maker. These communication lines are physical and therefore have a physical entry into the facility. The physical entry points for the coaxial cable, twisted pair and power lines are represented by NIU boxes 14, 15, and 16 respectively. Also shown is an input medium using radio frequencies (RF) 17. Devices that communicate through this medium are remote devices/wireless devices that include devices such as cellular telephones. In the present invention, there would be a status of each device in facility regardless of the manner in which the device is powered or the manner in which the device communicates. This state manager 18 is a process that captures status information for the various devices and coordinates communications between the various devices in the facility. In addition, this state manager 18, using industry standard format, provides persistence to a data store and can transmits data to any device in the facility. Section 19 illustrates a cluster of bridges and routes that provide communication links between the incoming information lines (11, 12, and 13), the distribution devices 20 and 20' and the devices.

As previously mentioned, the devices that utilize the CEBus standards contain context data structures. Each CAL Context is a predefined data structure built from reusable objects, and represents a common consumer product function such as a tuner, time or temperature sensor. These context data structures are defined in set of subsystems definitions that represent industry standard guidelines that define the behavior of the device. These guidelines are necessary to enable products to correctly use the subsystem models.

Figure 2:
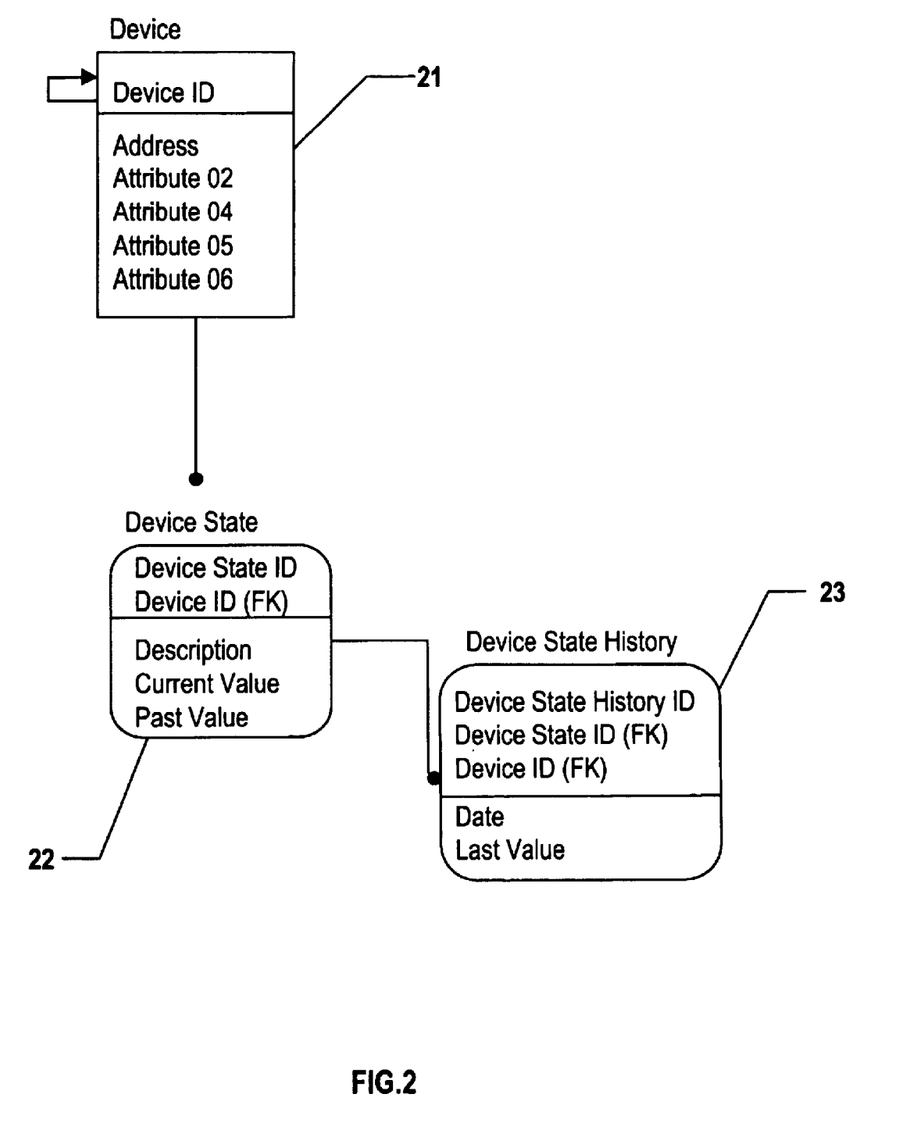
FIG. 2 illustrates a state diagram showing the state management of a CAL message compliant device.
Figure 3:
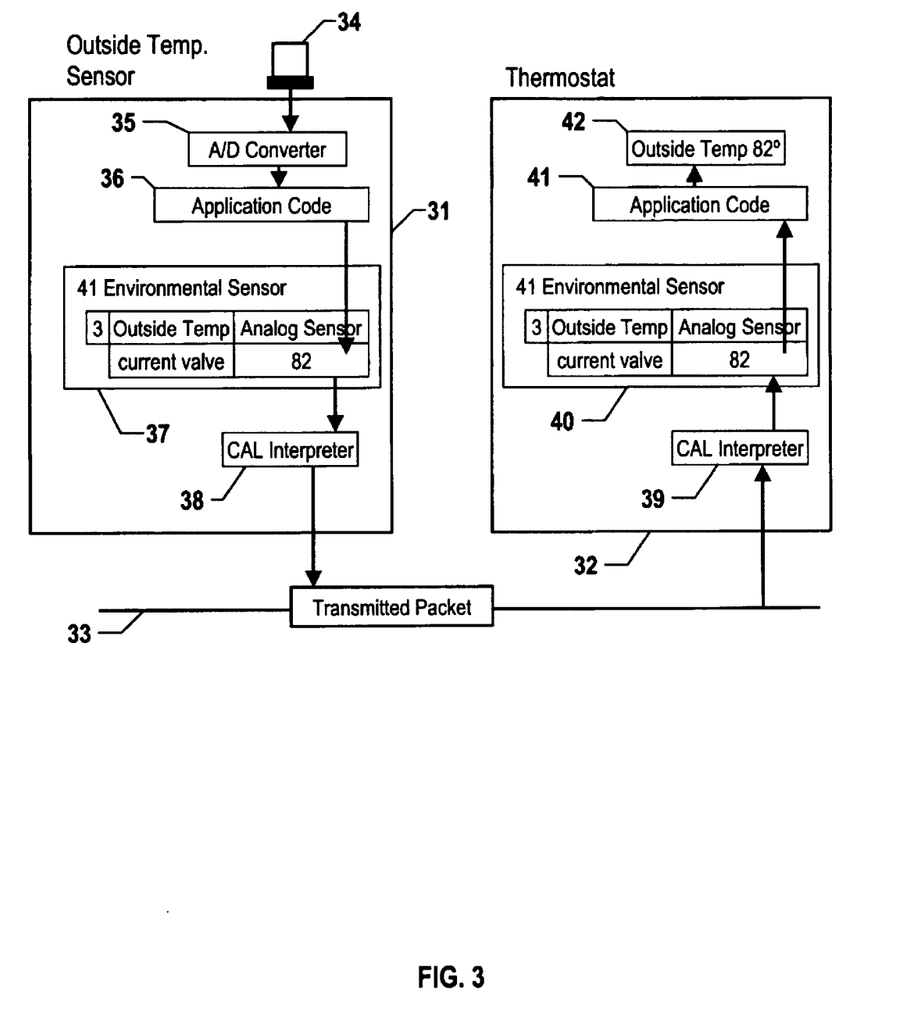
FIG. 3 is a diagram that illustrates the creation and management system for workflow routines in accordance with the present invention.

FIG. 2 illustrates a process and data flow model of a device state management system of the present invention. It maintains state (status) information of all devices, sensor and components that it can communicate on the system. This model provides the basis and core of sub systems status (state), transition and event driven based decision-making operation. It maintains current status of devices and it's past state history. It also offers the capacity to reset status in the event of an interruption in power or reversing an updating entry. The names chosen in this model exemplify distinctly what the process flow represents. Regardless, if the entities and its attributes are renamed or represented in a de-normalized fashion. The effect of the model is the same. The device 21 comprises attributes that define it current data values, and primary event driven operations. Devices can also be an aggregation of smaller devices (i.e. sensors, components, etc.) The device has a Unique Identifier and sensor(s) or component(s) that are aggregated make up that device [i.e. a thermal sensor, and a Thermostat (consists of thermal sensor, LED display etc.) are both considered devices. Though one attribute may be part of the composition of another.] The device state 22 represents current status configuration of the device. This device state comprises: 1) Device State ID—Unique identifier of the specific status state it references, 2) Description—Clear Definition of the State that is identified by the Device State ID, 3) Current Value—Current Status value of the device and 4) Past Value—Previous Status value of the device. The Device State History 23 contains the history of pass values per device which include: 1) Date—Date of historical record and 2) Last Value—last value recorded on that date FIG. 3 illustrates a system for which the present invention can create and manage workflow routines 24. The workflow management component 25 manages the set of scenarios, which represent the collective usage pattern of one or more devices by a user. The components of workflow management are usage 26, device usage 27, scenario 28, workflow 29 and workflow session 30. The workflow management concept is further described in a co-pending patent application number AUS920020210US1 to the same assignee. The contents of which are incorporated herein by reference. The usage attribute 26 is a default generic intent of a sensor, component or device. The usage ID defined the usage record. The description is the usage definition (i.e. temperature sensor). The Device Usage attribute 27 is the actual usage of device. The device usage ID uniquely defines the device usage record. The description defines the actual device usage in words such as fire detector. The Scenario 28 is a user defined device usage pattern. The Scenario ID defines the scenario record. The Workflow 29 is a user-defined sequence of scenarios. The Workflow ID defines the workflow record. The Sequence Number identifies what sequence this workflow is executed, when there is more than one workflow defined. The description accurately defines the workflow intent. The Workflow Session 30 manages the existence of an executing workflow(s). The Workflow Session ID defines the record, which represent the life of an executing workflow.

Figure 4:
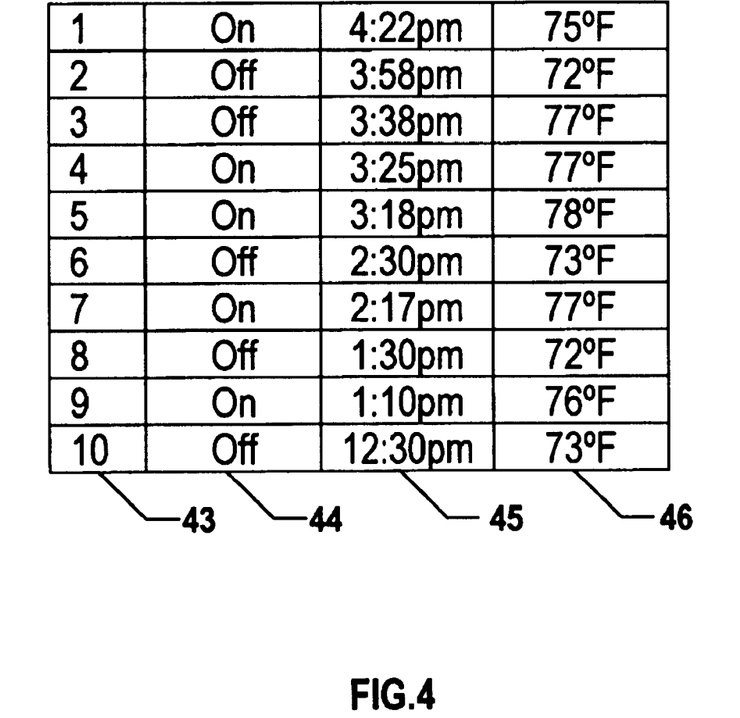
FIG. 4 represents an example of the application of the present invention to a thermostat system.
Figure 5A:
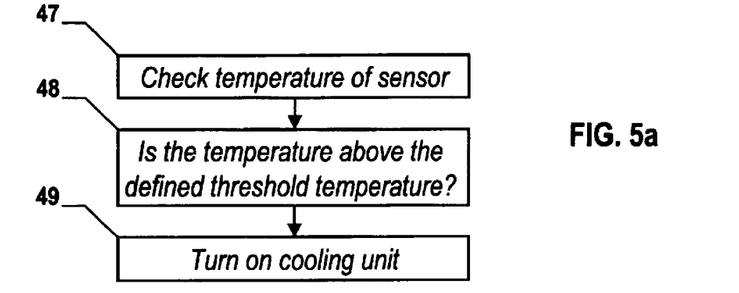
FIG. 5 is an example of a state history for the thermostat shown in FIG. 4.
Figure 5B:
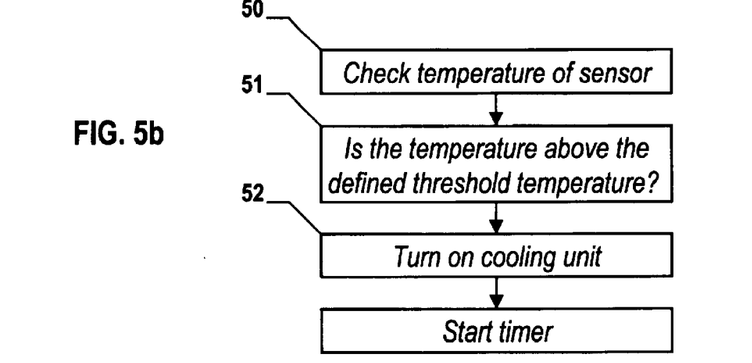
Figure 5C:
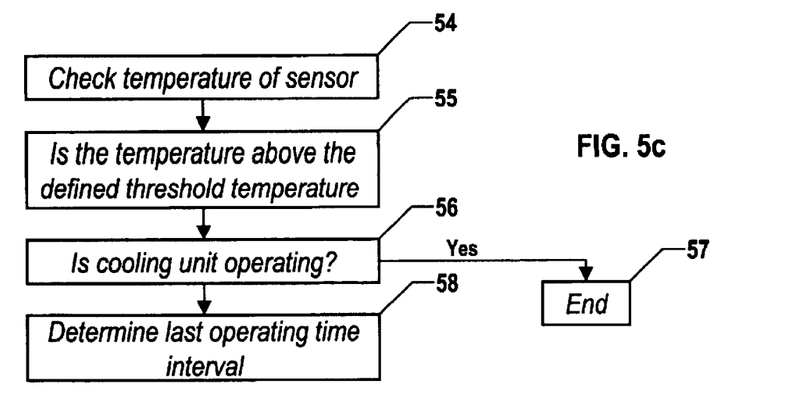
Figure 5D:
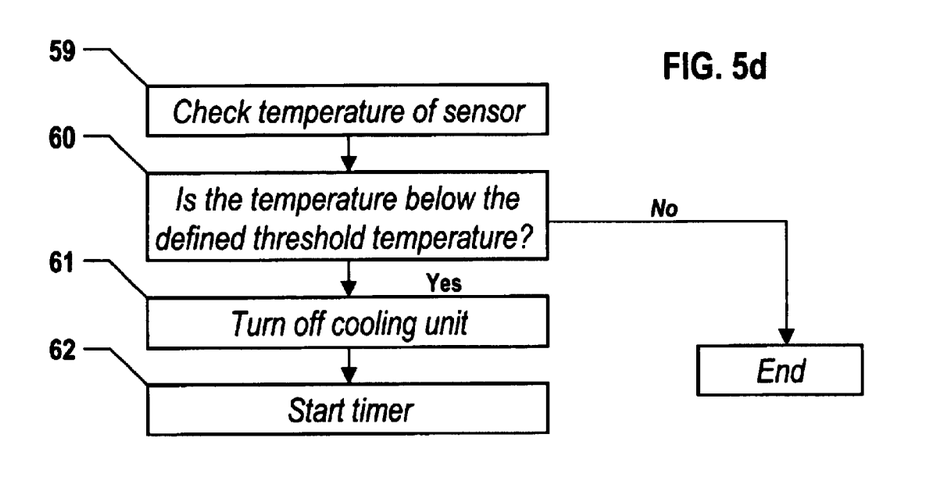

The implementation of the methods of the present invention can be illustrated through applications to the thermostat system shown in FIG. 4. This system comprises two different devices that communicate with each other using this CEBus network topology standard. One device is an outside temperature sensor 31, the other being a thermostat 32. Both devices store within their solid-state memory context data structures, in which contain different attributes and their values. The sensor and thermostat can communicate with the state manager 18 over a transmission bus 33. The outside temperature system comprises an actual sensor 34 that detects the current outside temperature. This sensor sends an analog signal of the measured to temperature to an A/D converter 35 that converts the signal to digital form. The application code box 36 processes this signal and sends it to a display 37. This application code box 36 contains standard software that can exist on any device. The use of a Consumer Electronic Bus (CEBus) protocol allows for application software to reside on each device. Box 37 displays the current temperature measured by the sensor 34. The Common Application Language (CAL) interpreter 38 receives this measurement and transmits the information via the transmission bus 33 to the state manager. The CAL interpreter parses and understands the message format and the transmitted packet represents a communication link between the two devices. This information would be recorded for the temperature sensor in a storage section each time the temperature sensor detected a change in temperature. The internal thermostat 32 contains a Common Application Language (CAL) interpreter 39 to facilitate communication via the transmission bus 33 with the state manager 18. Also contained in the thermostat is a temperature display 40 similar to the display 37 in the outside temperature sensor 31. Application code 41 puts the temperature information in a form for the temperature display 42. In accordance with the present invention, upon receiving the change in temperature notification from the temperature sensor, the state manager 18 can send a temperature change notification to the thermostat of the new sensed temperature. The thermostat can then adjust the room or facility based on the new sensed temperature. This thermostat changed will then be broadcast/sent to the state manager 18 and recorded as a change in status of the thermostat.

FIG. 5 shows the stored status history for the thermostat device of the system in FIG. 4. This information could describe the operation of a central air conditioning/heating system with a configuration that is similar to the systems in many commercial buildings or residential homes. The recorded data stored in this format comprises attributes such device state 43, Power 44, Temperature 45, and Time 46.

Figure 6:
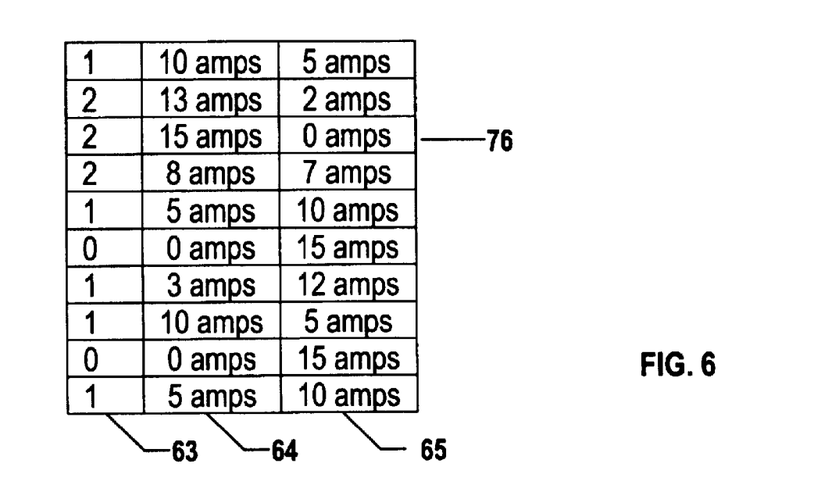
FIGS. 6a, 6b, 6c, and 6d are examples of various workflow instruction sets for the thermostat shown in FIG. 4.

FIG. 6a shows a standard workflow routine to control the operation of the thermostat for the purpose of controlling the operation of a cooling unit. In the typical operation, the thermostat is set to a threshold temperature. If the room temperature exceeds this set threshold temperature, the thermostat will send a signal to turn on the cooling unit. The cooling unit will operate for a set time period or until the room temperature falls below the threshold temperature of the thermostat. In the context of the present invention, step 47 of FIG. 6a checks the temperature registered on the temperature sensor when there is a recorded temperature change to the temperature sensor. In accordance with the status history recording technique of the present invention, when the temperature sensor measure a change in temperature this change is recorded in the repository records for the sensor. In the check of the temperature sensor in step 47, the location where the record temperature is stored will be accessed and there will a retrieval of the new temperature information. In step 48, there will be comparison of the new temperature with the set threshold temperature. If the new temperature exceeds the threshold temperature, then step 49 will send a signal to activate or turn on the cooling unit.

FIG. 6b is another workflow routine that is designed to cover a scenario where the user wants to limit the amount of time the cooling unit continuously operations to 20 minute intervals. Prior to the implementation of this routine, the threshold temperature and the maximum operating time interval will be determined and entered into the workflow. When there is a change in the status of the temperature sensor, this workflow will be activated. In this system, there will be a change in the status of the temperature sensor each time the sensor detects a change in the temperature. In step 50, there will a check of the current temperature at the sensor. This temperature check will involve retrieving the current temperature for the sensor. Step 51 will compare this temperature to the threshold temperature to determine whether the current temperature exceeds the threshold temperature. If this current temperature does exceed the threshold temperature, then step 52 turns on the cooling unit. Step 53 also starts a timer. With this workflow, the cooling unit will operate until the timer reaches 20 minutes.

FIG. 6c is another workflow routine that can be initiated when there is a change in temperature during the presence of the workflow described in FIG. 6b. As with the other workflow routines, step 54 retrieves the current temperature for the temperature sensor from the repository. Step 55 will compare this temperature to the threshold temperature to determine whether the current temperature exceeds the threshold temperature. If this current temperature does exceed the threshold temperature, then step 56 determines whether the cooling unit is currently operating. If the cooling unit is currently operating, then the workflow terminates in step 57. At this point, it is no need to continue this workflow. However, if the cooling unit is not operating, step 58 determines the last operating interval. If the last operating interval is within 20 minutes, then the unit has not been off for at least 20 minutes. In this case, the unit will not be activated even though the temperature is above the threshold temperature.

FIG. 6*d* illustrates a workflow routine for a scenario when the sensor detects a temperature that is below the threshold temperature. Steps 59 and 60 are the same as in steps 54 and 55 of FIG. 6*c*. After there is a determination that the current temperature is below the threshold temperature, step 61 turns off the cooling unit. Step 62 then starts the timer.

Although not a part of this invention, the workflow routines describes in FIGS. 6*b*–6*d* are controlled by a workflow manager that determines which workflow is activated based on the current condition and the readings of the temperature sensor. For example, when the temperature sensor detects a change in the temperature, the workflow manager will detect a change in the status of the temperature sensor. If there is a temperature increase, the workflow manager will know to activate the workflow routines in FIGS. 6*b* and 6*c*. If there is a decrease in the temperature, the manager will activate the workflow in FIG. 6*d*.

Figure 7:
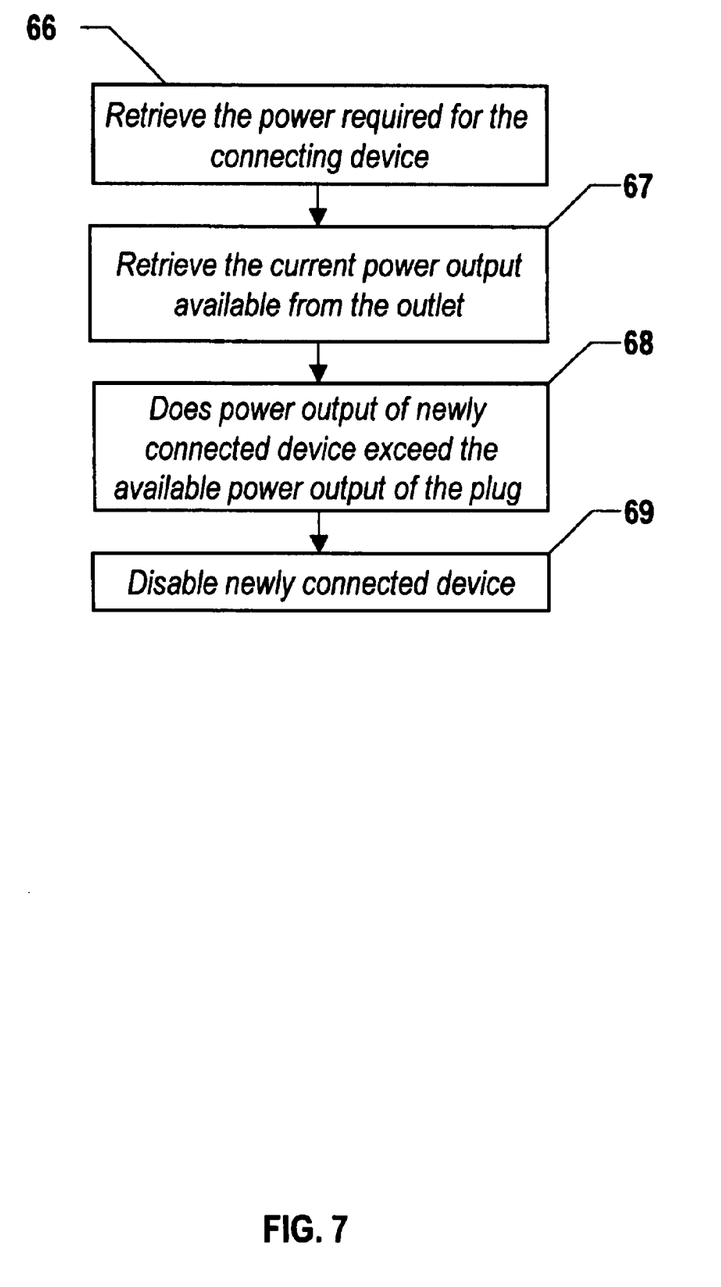
FIG. 7 is an example status history of an electrical outlet device of a network stored in accordance with the method of the present invention.
Figure 8A:
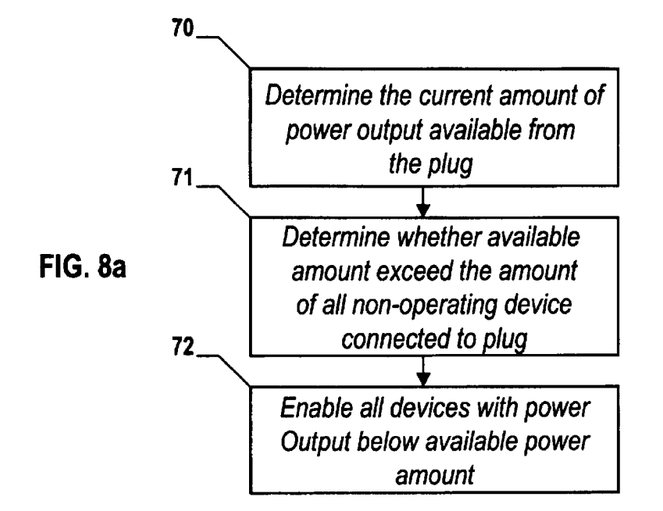
FIG. 8 a flow diagram of the steps in a workflow of the present invention implemented for an electrical outlet device.
Figure 8B:
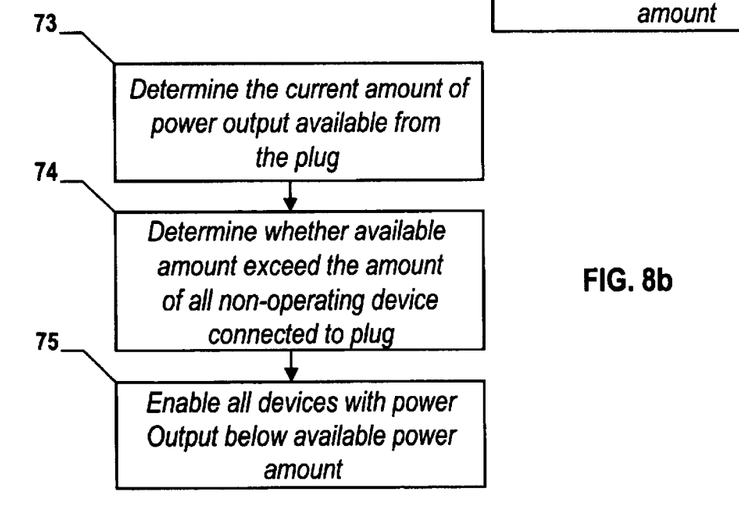

Another example of a workflow routine for a device is illustrated in FIGS. 7 through 9. The device in this example is an electrical outlet. The outlet can supply a defined amount of power output. For this discussion, the power output will be 15 amps. FIG. 7 shows a device status history chart. This chart contains columns for the number of connected devices that are currently drawing power from the outlet 63, the current amount of power drawn 64 and the current amount of available power 65. The workflows for this outlet will control the amount of power that can be drawn from this outlet to prevent the possibility of overloading the outlet.

FIG. 8 a flow diagram of the steps in a workflow of the present invention implemented for an electrical outlet device. Referring back to the system described in FIG. 1, all devices that connect to the outlet device will submit to the central controller specific device about the connecting device. This information will include the type of device and the amount of power required for the device to operate. When a device connects to the outlet device, there is an activation of the workflow in FIG. 8. The step 66 retrieves the maximum power required to operate the device. Step 67 retrieves the current amount of power available from outlet. Step 68 determines whether there is sufficient available power for the newly connected device to operate. If it is not enough available power, then step 69 will disable the newly connected device until there is sufficient available power for the device to operate.

FIG. 9*a* illustrates a workflow routine for an electrical outlet when a device connected to the outlet begins operations. When a connected device ceases to operate, there will be an increase in the available power at the outlet. This status change will be sent to the storage repository for the outlet device. Step 70 will determine the amount of power now available from the outlet. Step 71 will determine if the amount of available power is greater than the amount of power required by all non-operating devices connected to the outlet. If the available power is greater than the power required by the non-operating devices, then step 72 will enable all non-operating devices.

FIG. 9*b* is a flow diagram of the workflow for an electrical outlet when a device connected to the outlet ceases operations. When a non-operating device begins to operate, this device will begin to draw power through the outlet device. As with FIG. 9*a*, this status change will activate the workflow routine in FIG. 9*b*. Step 73 will determine the amount of power now available from the outlet. Step 74 will determine if the amount of available power is greater than the amount of power required by all non-operating devices connected to the outlet. If the amount of available power is not greater than the power required by some of the connected devices, then step 75 will disable the devices that have power requirements that exceed the available power at the outlet device. In an example, a 15-amp outlet device has three devices connected to it. One of the devices requires 10 amps and the other connected devices require five amps and three amps respectively. As shown record 76 of FIG. 7, when the three amp and five amp devices are operating, there are only seven amps of available power. Therefore, the 10-amp device, if it is not operating, will be disabled until one of the devices ceases to operate and draw power. At that time, the 10-amp device will be enabled.

There are many other examples of workflow routines that could be applied to control the operation of any device. The range of workflow routines can be from one attribute of one device to multiple attributes from multiple devices. The combinations of workflow routine designs can be potentially endless. However, the creation of a workflow scenario will have a basis in the device status history information that is gathered for each device.

It is important to note that while the present invention has been described in the context of a fully functioning data communication system, those skilled in the art will appreciate that the processes of the present invention are capable of being distributed in the form of instructions in a computer readable medium and a variety of other forms, regardless of the particular type of medium used to carry out the distribution. Examples of computer readable media include media such as EPROM, ROM, tape, paper, floppy disc, hard disk drive, RAM, and CD-ROMs and transmission-type of media, such as digital and analog communications links.

We claim:

1. A method for initiating routines that control device activities on a computerized system for a facility, for routing initiation being based on status information, of system devices in the facility, stored in a central location of the computerized system, comprising the steps of:

defining a set of conditions in which the operation of a device is to be automatically controlled;

defining a set of one or more devices that will have status data that will impact the defined condition;

detecting a change in the status of one of the devices in the defined set of devices;

determining whether the status change of device creates a set of device statuses that match the defined condition under which the operation of a device is to be automatically controlled; and initializing one or more routines to effect the operation of a device on the system based on the occurrence of the defined conditions.

2. The method as described in claim 1 further comprising before the step of determining when the defining conditions have been met, the step of recording each status change of a defined device.

3. The method as described in claim 2 wherein said status recording step further comprises the steps of:

installing a device on a monitoring system that has a centralized status manager and storage location, said device being one of a plurality of devices on the monitoring system;

receiving at the centralized manager a status change notification from one of the devices on the system;

identifying the specific device on the system that transmitted the status change notification; and storing the status change information in the storage location for that specific device.

4. The method as described in claim 3 wherein said installation step further comprises the steps of identifying device attributes that will impact a change in the status of the device and creating a storage record for the device based on the identified device attributes.

5. The method as described in claim 4 wherein a status change notification step further comprises the step of compiling the status change notification message, which will include the current status of each designated device attribute.

6. The method as described in claim 3 further comprising after said storing step, the step of updating the presently stored status information for the device transmitting the status change notification.

7. A computer program product in a computer readable medium for initiating routines that control device activities on a computerized system for a facility the routine initiation being based on status information, of system devices in the facility, stored in a central location of the computerized system, comprising:

instructions for defining a set of two or more conditions in which the operation of a device is to be automatically controlled;

instructions for defining a set of two or more devices that will have status data that will impact the defined condition;

instructions for defining a set of attributes for each of the set of the devices that will be used to impact the defined condition;

instructions for detecting a change in the status of one of the devices in the defined set of devices;

instructions for determining whether the status change of device creates a set of device statuses that match the defined condition under which the operation of a device is to be automatically controlled; and instructions for initializing one or more routines to effect the operation of a device in the network.

8. The computer program product as described in claim 7 further comprising before the instructions for determining when the defining conditions have been met, the step of recording each status change of a defined device.

9. The computer program product as described in claim 8 wherein said status recording instructions further comprise:

instructions for installing a device on a monitoring system that has a centralized status manager and storage location, said device being one of a plurality of devices on the monitoring system;

instructions for receiving at the centralized manager a status change notification from one of the devices on the system;

instructions for identifying the specific device on the system that transmitted the status change notification; and instructions for storing the status change information in the storage location for that specific device.

10. The computer program product as described in claim 9 wherein said installation instructions further comprise the instructions for identifying device attributes that will impact a change in the status of the device and creating a storage record for the device based on the identified device attributes.

11. The computer program product as described in claim 10 wherein a status change notification step further comprises instructions for compiling the status change notification message, which will include the current status of each designated device attribute.

12. The computer program product as described in claim 9 further comprising after said storing instructions, the instructions for updating the presently stored status information for the device transmitting the status change notification.

* * * * *